United States Patent [19]
Tackles

[11] Patent Number: 5,387,949
[45] Date of Patent: Feb. 7, 1995

[54] EYEGLASS CONNECTION DEVICE

[75] Inventor: George Tackles, Lake Elsinore, Calif.

[73] Assignee: Oakley, Inc., Irvine, Calif.

[21] Appl. No.: 825,476

[22] Filed: Jan. 29, 1992

[51] Int. Cl.6 .............................................. G02C 5/14
[52] U.S. Cl. ..................... 351/121; 351/44; 351/110; 351/140
[58] Field of Search ............... 351/121, 110, 111, 140, 351/41, 158, 153, 141, 142, 149, 44

[56] References Cited

U.S. PATENT DOCUMENTS

| | | |
|---|---|---|
| Re. 17,994 | 3/1931 | Emons . |
| D. 150,924 | 9/1948 | Bright . |
| D. 182,459 | 4/1958 | Eisler . |
| D. 187,394 | 3/1960 | Moeller . |
| D. 293,450 | 12/1987 | Jannard . |
| D. 324,394 | 3/1992 | Jannard . |
| D. 331,587 | 12/1992 | Jannard et al. . |
| 916,109 | 3/1909 | Cook . |
| 946,596 | 1/1910 | Cook . |
| 1,987,702 | 1/1935 | Nerney ................................ 351/110 |
| 2,192,092 | 2/1940 | Miller, Jr. . |
| 2,362,725 | 11/1944 | Slotsky ................................ 351/140 |
| 2,397,243 | 3/1946 | Cooper, Jr. . |
| 2,482,664 | 9/1949 | Gagnon . |
| 2,534,655 | 12/1950 | Baratelli . |
| 2,571,704 | 10/1951 | Gilden ................................ 351/140 |
| 2,607,919 | 8/1952 | Stegeman . |
| 2,770,806 | 11/1956 | Moeller . |
| 2,825,267 | 3/1958 | Gagnon ............................... 351/110 |
| 3,066,573 | 12/1962 | Moeller . |
| 3,156,756 | 11/1964 | Seaver . |
| 3,233,249 | 2/1966 | Baratelli et al. . |
| 3,517,393 | 6/1970 | Beauchef . |
| 3,756,704 | 9/1973 | Marks . |
| 3,838,914 | 10/1974 | Fernandez . |
| 4,523,819 | 6/1985 | Dianitsch et al. . |
| 4,674,851 | 6/1987 | Jannard . |
| 4,730,915 | 3/1988 | Jannard . |
| 4,824,233 | 4/1989 | Jannard . |
| 4,951,322 | 8/1990 | Lin . |

FOREIGN PATENT DOCUMENTS

| | | |
|---|---|---|
| 3413827 | 8/1985 | Germany . |
| 62-2093 | 12/1983 | Japan . |
| 61-41069 | 1/1986 | Japan . |

*Primary Examiner*—William L. Sikes
*Assistant Examiner*—Hung Xuan Dang
*Attorney, Agent, or Firm*—Knobbe, Martens, Olson & Bear

[57] ABSTRACT

Disclosed is a connector for use in connecting a lens to an earstem, comprising a main body which contains a hinge end and a lens receiving end. The connector contains a channel for receiving a portion of the lens. The pivot end of the channel contains a recess whereas the locking end of the channel contains a projection. The hinge end of the connector is attached to the earstem by a releasable pin connection. The lens is connected to the connector by inserting a lens into the channel where the lens is pivoted at the pivot end and then the connector is snapped down to cover over the top edge of the lens. Variations, component parts, and a wire frame dual lens detachable component system are also disclosed.

18 Claims, 3 Drawing Sheets

EYEGLASS CONNECTION DEVICE

BACKGROUND OF THE INVENTION

The present invention relates to a connector for connecting an eyeglass lens to an earstem. The connector enables the user to interchange different earstems with different lenses, thus creating different color or configuration combinations.

This invention can be used with any shape of lens or earstem that is designed to accept the connector. In addition, the connector of the present invention is useable with both dual lens and unitary lens eyeglass systems. The connector is easily attachable and removable from the top, side or bottom edge of the lens, yet provides a sturdy connection when locked into position.

Unitary lens eyeglasses having interchangeable lenses are known in the art. See, for example, U.S. Pat. Nos. 4,824,233 and 4,867,550, both to James H. Jannard. The upper frame in these prior devices generally comprises a bar extending across the top edge of the lens and connecting to both earstems.

In order to switch lenses, the top edge of the new lens typically has a complementary shape to a slot extending the length of the upper frame. Thus, the shape of the top edge of the lens was generally dictated by the unique shape of the frame.

Thus, there remains a need for a connector that allows for the quick and easy interchange of earstems or lenses that will be secure when in the locked position, but that minimizes the need for structural correspondence between the edge of the lens and the lens contacting portion of the frame, and which does not require a frame along the entire top edge of the lens.

SUMMARY OF THE INVENTION

There has been provided, in accordance with one aspect of the present invention, an eyeglass connection device that connects the earstem to the lens, which enables the user to interchange the lens or earstem. There are two connectors in a standard eyeglass assembly, each connecting an earstem to the lens. Thus, one may change both earstems or either one of them.

The connector comprises a main body having a lateral end a medial end, and a lens receiving channel extending from the medial end in the direction of the lateral end. A first interlock structure is provided in the lateral end of the channel, and a second interlock structure is spaced apart from the lateral end of the channel.

Preferably, the first interlock structure comprises a locking surface for engaging a corresponding locking surface on a lens for resisting vertical upward motion of the lateral end of the connector with respect to the lens. The locking surface on the first interlock structure preferably comprises a ramped edge of a projection on the connector. The projection is preferably integrally molded on the connector, and extends within the channel in the medial direction.

The second interlock structure comprises a locking surface for releasably engaging a corresponding locking surface on the lens. Preferably, the second interlock structure comprises at least one projection within the channel for engaging a recess in the lens. More preferably, the second interlock structure comprises first and second projections on the connector extending towards each other from opposite sides of the channel for engaging opposing recesses in the lens. Alternatively, the second interlock structure comprises at least one recess in the channel for receiving at least one projection on the lens.

In accordance with a further aspect of the present invention, there is provided a sunglass comprising a unitary transparent lens adapted to extend in a curved pane in the path of the wearer's left and right eye fields of vision, said lens having at least one connector extending along a portion of an edge of the lens, the connector having an elongated slot formed therein to removably receive a portion of the edge of the lens.

At least one projection is provided on the lens to interlock within a recess on the connector at a first end of the connector. A locking surface is provided on the connector, spaced apart from the recess, for releasably engaging a locking surface on the lens.

Preferably, the connector extends no more than about one-third of the way across the top edge of the lens. More preferably, the connector extends no more than about one-fifth of the way across the top of the lens. Alternatively, the connector extends along at least a portion of either the lateral edge of the lens or the bottom edge of the lens. In a further alternative, the connector connects to a flange or other extension of a frame for the lens.

In accordance with a further aspect of the present invention, there is provided a method of removably securing an earstem to a lens or frame in a pair of eyeglasses of the type having a right and left lens region, a nose piece and right and left earstems. The right and left lens regions are generally defined by a horizontal axis which extends from side to side throughout the left and right lens regions, and which is longer than a vertical axis which extends generally perpendicular to the horizontal axis.

The method comprises the steps of providing a frame or lens having a first and a second interlock structure thereon, and providing a connector having a slot therein for receiving the lens, said connector having a first and second complementary interlock structure thereon.

The connector is advanced along the horizontal axis until the first interlock structure of the connector is in contact with the first interlock structure on the lens. The second interlock structure on the connector is thereafter rotated downward, generally along the vertical axis, until the second interlock structure on the connector engages the second interlock structure on the lens.

In accordance with a further aspect of the present invention, there is provided a lens for assembly using the connectors of the present invention into an eyeglass of the type suitable for participation in active sports such as biking, skiing and the like.

The lens comprises a unitary pane having an upper edge and a lower edge, the lower edge having a nose piece opening formed therein for cooperating with the connectors and earstems to mount the lens on the nose of the wearer. The nose piece opening has an upper extremity, and the distance separating the upper extremity of the nose piece and the upper edge of the pane being defined as D1, and the distance separating the upper edge of the pane and the lower edge of the pane is defined as D2. D1 is in the range between about ½ inch and 1-¾ inches, and D2 is in the range of from about 1¼ inches to about 2¾ inches.

The lens has an arcuate cross-sectional configuration in a horizontal direction from a first lateral end to a second lateral end, having an arc length within the range of from about 5-½ inches to about 7 inches.

At least one lateral interlock structure is provided in the upper lateral region of the lens, and at least one medial interlock structure is spaced apart from the lateral interlock structure by no more than about one-half of the arc length of the lens.

Further objects, features and advantages of the present invention will become apparent in the detailed description of the preferred embodiments which follows, when considered together with the attached figures and claims.

DETAILED DESCRIPTION OF THE PREFERRED EMBODIMENTS

Figure 1:
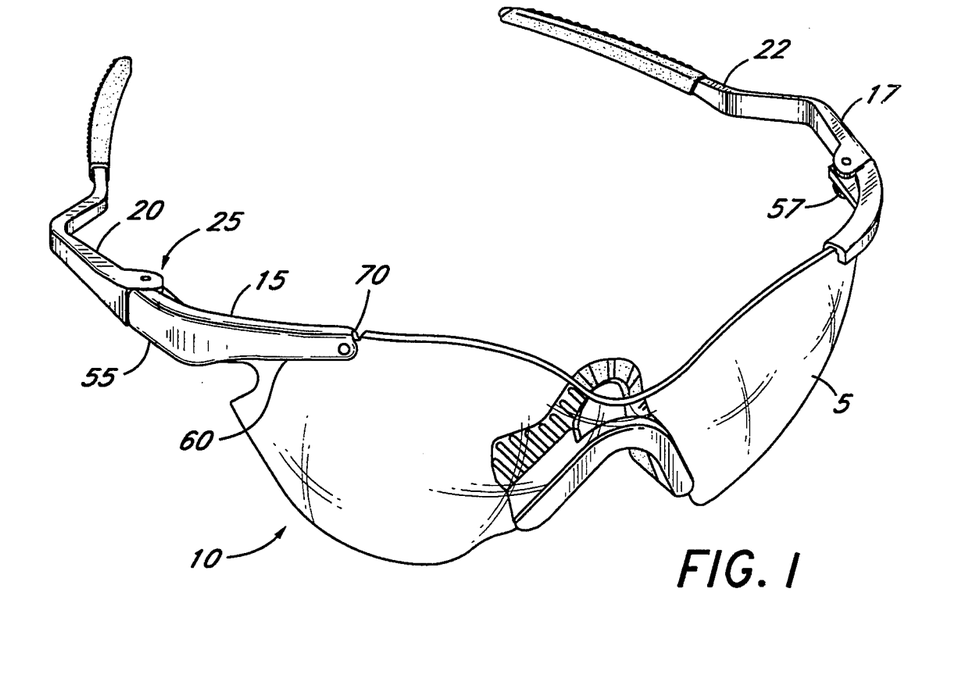
FIG. 1 is a front perspective view of a connection device of the present invention as part of an eyewear system.

Referring to FIG. 1, there is disclosed in accordance with one aspect of the present invention a unitary lens 5 connected to earstems 20, 22 via connectors 15, 17 to form an eyeglass system 10.

The eyeglass system 10 may comprise either a dual lens system or a unitary lens system. Dual lens systems are well known in the art of prescription glasses, and include a separate right lens and left lens held in place in front of the range of vision of the wearer's right and left eyes by a conventional frame. See, e.g., FIG. 5.

The unitary lens systems utilize a single lens extending throughout both the wearer's left eye and right eye fields of vision. Unitary lenses having a variety of configurations which may be used in combination with the present invention are known in the art. For example, unitary lenses having a configuration which defines a portion of the surface of a cylinder are disclosed in U.S. Pat. No. 4,859,048 to James H. Jannard, which is incorporated herein by reference. Unitary lenses having a configuration which defines a portion of the surface of a toroid are disclosed in U.S. Pat. No. 4,867,550 to James H. Jannard, which is also incorporated herein by reference. In addition, unitary lenses having a configuration which defines a portion of the surface of a sphere, a frusto conical or other geometrical configuration can also be utilized in combination with the connectors of the present invention.

Since both connectors 15, 17 and both earstems 20, 22 are preferably mirror images, respectively, reference will be made to only one connector 15 and one earstem 20 herein. Referring to FIG. 1, connector 15 comprises a hinge end 55 and a lens receiving end 60.

In the illustrated embodiment, the connector 15 has a lens receiving channel 75 that starts from the lens receiving end 60 and extends through at least a part of the length of the connector 15. The channel 75 has a locking end 70 located at the lens receiving end 60 of the connector 15, and a pivot end 65. See FIG. 2. The terms "locking end" and "pivot end" are used only as descriptive terms for the functioning of the illustrated embodiment, and not as a limitation on the scope of the invention.

The length of the connector 15 and channel 75 can be varied depending upon the desired contact area between the connector 15 and the connector contacting surface 39 of lens 5. Typically, each connector will extend no more than about half way across the top of the lens 5 in a top mount embodiment. Preferably, each connector will extend no more than about a third of the way across lens 5 thereby leaving at least about a third of the upper lens edge exposed. More preferably, connector 15 will extend no more than about one fifth of the arc length of lens 5. Thus, in a lens having an arc length of about 6 inches, each connector contacting surface 39 will have a length within the range of from about ¾ inches to about 1-¼ inches.

Preferably, the medial end of the connector contacting surface 39 is defined by a ramp or shoulder 41 corresponding to the thickness of the back wall of the channel 75 so that the upper edge of the installed connector 15 and lens 5 form a generally smooth transition.

Alternatively, the connector 15 can readily be adapted to extend along the lateral edge or bottom edge of the lens 5. In these embodiments, the connector will be releasably retained on the lens by two or more cooperating locking surfaces, as will be discussed in connection with the top mount embodiment, infra.

The hinge end 55 of connector 15 is connected to the earstem 20 via a pin connection 25. In the illustrated embodiment, a flange 57 extends from the main body of the connector 15, and is provided with a pin or recess to cooperate with corresponding structure on the earstem for pivotably securing the earstem 20. The pin connection 25 allows the earstem 20 to be folded inward toward the lens 5 so that the eyeglass 10 will take a more compact shape.

In general, flange 57 is adapted for removable insertion between a pair of generally parallel extensions 58 and 59 on the hinge end of the earstem 20. See, e.g., FIG. 2. Flange 57 in the illustrated embodiment is provided with a pair of opposing pins extending in opposite directions therefrom. Each pin is received in a recess or bore in the corresponding extension 58 or 59. These components are preferably molded or formed from a plastic material that will permit the extensions 58 and 59 to be separated slightly to releasably snap over the pins on flange 57.

Alternatively, the relationships of these components can be reversed in a variety of ways. For example, pins can be provided extending towards each other from the opposing inside surfaces of the extensions 58 and 59 to be received by a bore in the flange 57. The pin connection 25 will not be further described since variations will be readily understood by one of skill in the art in view of the disclosure herein.

Figure 2:
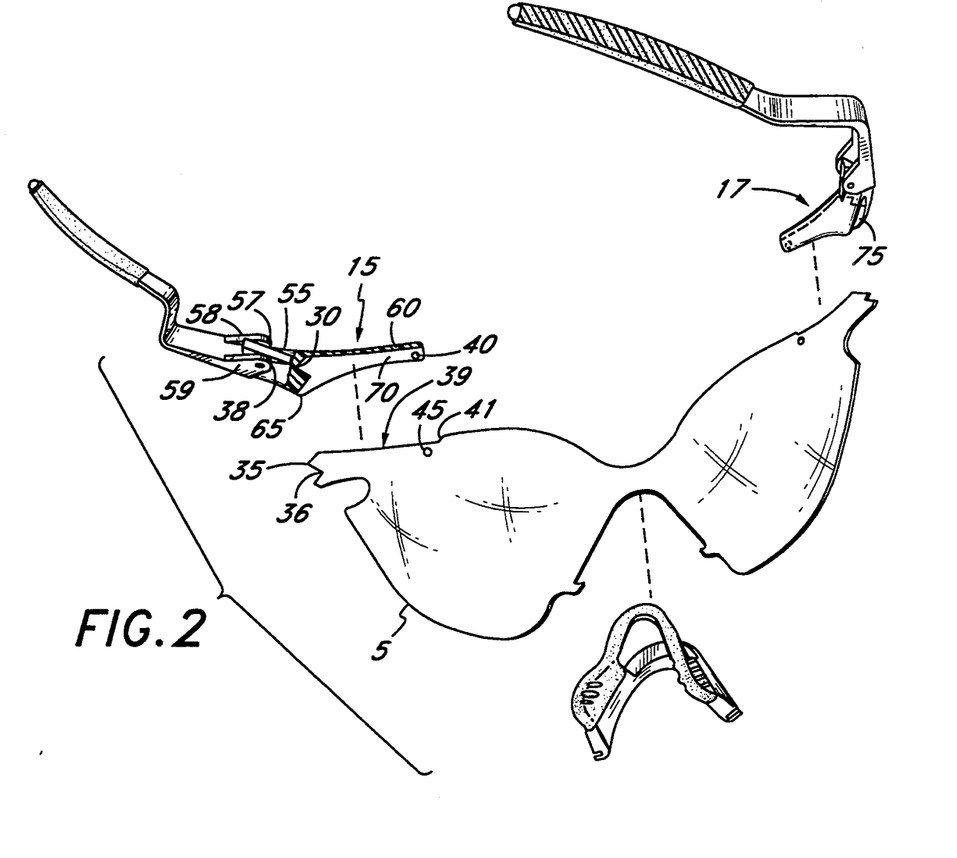
FIG. 2 is a partial exploded view of the eyewear of FIG. 1, including a partial cut away view of a connection device.

Referring to FIG. 2, the lens 5 is provided with a first locking structure such as tooth 35, spaced apart from a second locking structure such as indent 45. The tooth 35 defines a recess 36 on the bottom side thereof for receiving an interlocking structure such as extension 38 on the connector 15.

Although illustrated as an extension 38 on the connector 15 for engaging a recess 36 on the lens, any of a variety of complementary surface structures on the lens and connector will accomplish the inventive connection. In general, the first locking structure comprises a structure on the lens having a locking surface for resisting vertical upward movement of a corresponding locking surface on the connector 15. This may be accomplished by cooperating projections and indents having a variety of configurations, including interlocking "teeth" pins and recesses, beads and grooves and the like, as will become apparent to one of skill in the art in view of the present disclosure.

For example, the upper edge 39 of the connector receiving portion of the lens 5 can be provided with a plurality of bumps or projections extending generally transversely to the local plane of the lens. Alternatively, a continuous raised bead can extend along the edge 39 of the lens 5. In this embodiment, the inner surface of the channel 75 is provided with at least one recess for cooperating with the raised lens structure to provide a secure friction or interference fit. Installation can then be accomplished by sliding the lens axially into a slot on the connector having a "T" or functionally similar type cross section. Thus, the first and second locking structure can merge into a continuation of the same structure. The connector can additionally be permanently adhered to the lens such as by solvent based adhesives or heat; however, the two components remain removably secured in the preferred embodiment.

Figure 3:
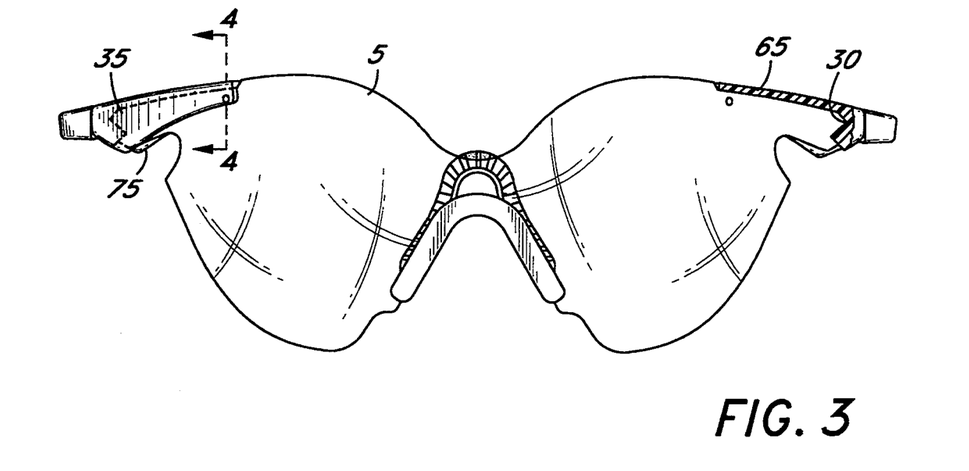
FIG. 3 is a front elevational view of eyewear including connection devices of the present invention, with one connection device in partial cut away view.
Figure 4:
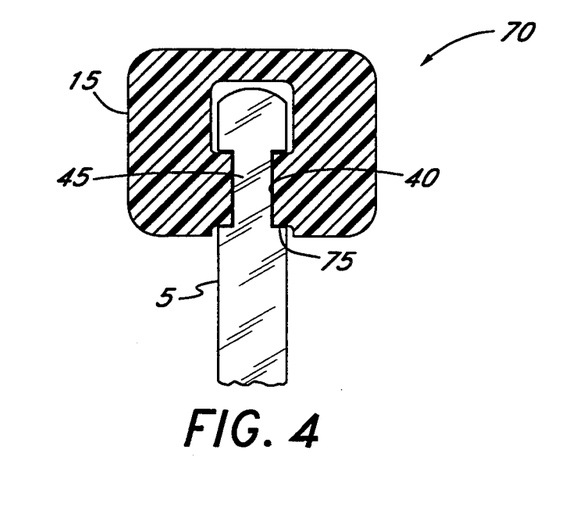
FIG. 4 is a cross-sectional view of a connection device of the present invention taken along line 4—4 of FIG. 3.

Referring to FIGS. 3 and 4, the second locking structure at medial end 70 of the channel 75 contains at least one interlocking structure such as projection 40. The projection 40 snaps into the indent 45 of the lens 5 when the connector 15 is locked into position.

There may be one indent 45 extending partially or completely through the lens, or two located on opposite sides of the lens 5. Indent 45 can take the form of a circular hole, elongate slot, shelf or shoulder formed beneath a ramp or otherwise, as long as a surface is provided for cooperating with the corresponding structure on lens 5 to produce a friction or interference fit.

Accordingly, there may be one projection 40 or there may be two or more located on opposing sides of the interior of the channel 75. The projection 40 can be of any shape generally as long as it has an interference fit with the corresponding locking structure on the lens, such as indent 45. The projection 40 can extend partway or even all the way along the length of the channel 75 in the form of a ridge, as has been discussed. In this embodiment, the first and second locking structures may be merged into a single elongate or repeating structure. The projection 40 is illustrated as located slightly above the bottom edge of the connector 15, but it can be located exactly on the bottom edge.

As will be apparent in view of the disclosure herein, the interlock structure on the lens cooperates with the corresponding interlock structure on the connector to produce an interference fit which resists both upward rotation of the connector about the tooth 35, and also lateral motion of the connector 15 with respect to the lens 5.

To attach the connector 15 to the lens 5, the tooth 35 of the lens 5 is advanced into the recess 30 of the connector 15 while the longitudinal axis of connector 15 is angled slightly above parallel to surface 39, so that the lens receiving end 60 is positioned above the connector receiving edge 39 of the lens 5. Once the tooth 35 is positioned in the recess 30, the lens receiving end 60 of the connector 15 can be pivoted down and snapped onto the top edge of the lens 5. The projection 40 of the connector 15 will advance into the indent 45 of the lens 5 to provide an interference fit. Removal is accomplished by the same steps in reverse. Removing the projection 40 from the indent 45 is accomplished by plastic deformation of the material utilized in making the connector 15 as the lens receiving end 60 is rotated upward about the tooth 35.

The order of attachment of the first and second locking structures will depend upon the particular embodiment. For example, if the medial locking structure comprises a projection and recess which are roughly mirror images of the lateral locking structure, either the medial or the lateral end of the connector can be set first.

The connector 15 is preferably molded as an integral unit from any of a variety of plastics conventionally used for detachable component sunglass frames. Alternatively, the slot 75 can be milled as a post molding step. In a unitary lens embodiment, the lens is preferably injection molded from polycarbonate or other conventional material and cut or ground to produce the appropriate profile.

Since the connector 15 is attached to the lens 5 at only a relatively small portion of the top, side or bottom edge of lens 5, the shape of the top edge of the lens may be varied without regard to the shape of an upper frame. This can be advantageous in a variety of circumstances, such as for uses in which it is desirable to minimize obstacles to the range of vision at the upper portion of the lens.

For example, bicyclists tend to look through the uppermost portion of the lens and can be distracted or limited by an upper frame. In addition, the range of vision for each eye at the top of the field of vision does not necessarily follow a uniform curve having a continuous single radius. Thus, positioning a single arcuate upper frame sufficiently high that it optimizes the field of view can result in the use of unnecessary lens and frame material in regions where it extends beyond the upper range of vision.

By eliminating the need for a full upper frame, the present invention permits contouring of the upper edge of the lens in a manner that minimizes weight while maximizing protection of the wearer's full field of vision, and at the same time retaining all of the advantages of rapid interchangeability of components without the use of tools.

Figure 5:
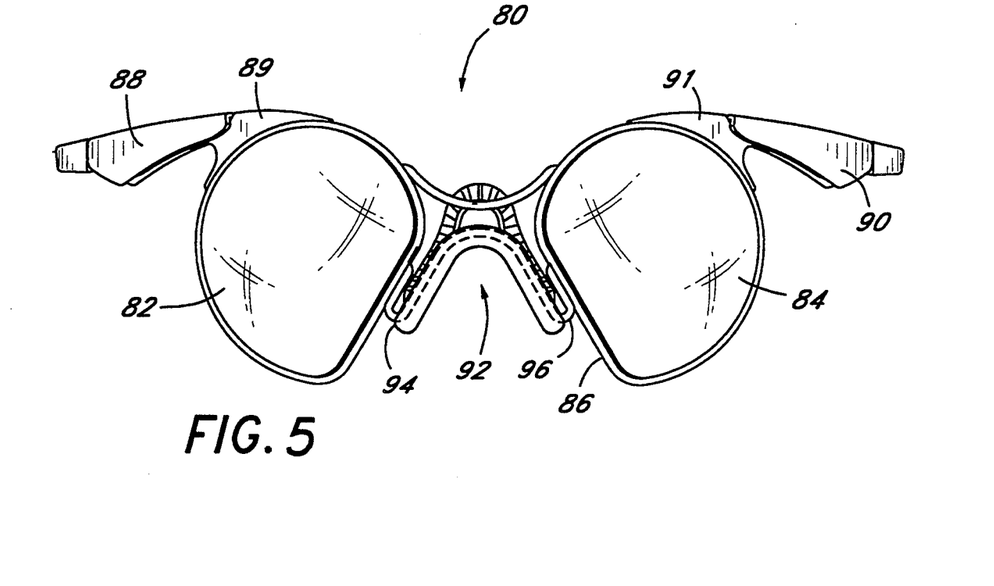
FIG. 5 is a front elevational view of a further embodiment of the present invention.

Referring to FIG. 5, there is disclosed a further embodiment in accordance with the present invention. A wire frame pair of eyeglasses 80 is disclosed, having a right lens 82 and a left lens 84 disposed in a wire frame 86. In a preferred embodiment, lenses 82 and 84 are removably disposed in the frame 86 to permit selective interchanging of lenses, as will be discussed.

Wire frame 86 is provided with a right mounting flange 89 and left mounting flange 91 for receiving connectors 88 and 90, respectively. Preferably, connectors 88 and 90 are removably secured to flanges 89 and 91, in the same manner as has been discussed in connection with FIGS. 1-4, supra.

Flanges 89 and 91 may be constructed of any of a variety of materials having sufficient structural strength to accomplish the intended function. However, in a preferred embodiment, the flanges 89 and 91 comprise a metal which is bondable to the metal used for the construction of the frame 86. A wide variety of metals are known in the art which may be utilized for the present purposes, including titanium, aluminum, nickel silver alloys, stainless steel, brass and various non-metal composites. These metals or other materials may be drawn into wire, or stamped from sheet stock, or otherwise molded or formed to create a frame 86 which may then be secured such as by soldering or brazing to flanges 89 and 91, which are preferably stamped from sheet stock, and thereafter provided with any desired curvature.

Preferably, the wire frame glasses 80 are provided with a nose piece 92 having a slot 94 extending along the upper surface thereof to receive a nose piece connector wire or flange 96. The nose piece connector wire 96 is preferably secured to the remainder of frame 86 by conventional brazing or soldering techniques. The foregoing construction permits the user interchangeability of nose pieces onto the wire frame 86, with the nose piece releasably retained in position by friction or interference fit structures, as will be apparent to one of skill in the art.

Figure 6:
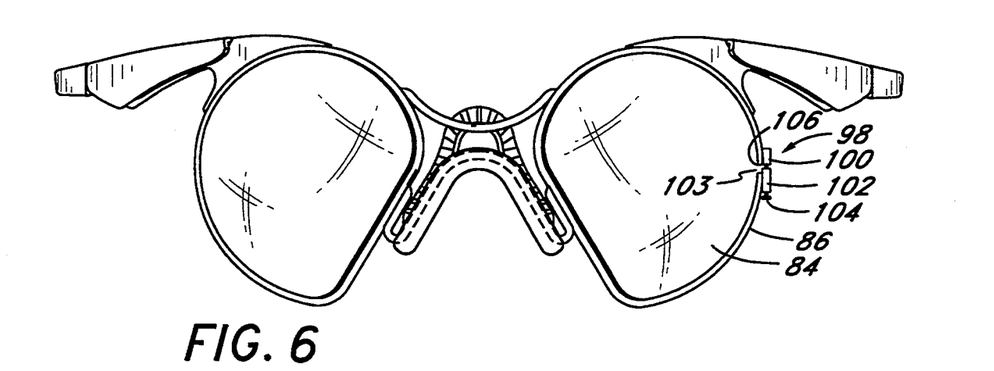
FIG. 6 is a front elevational view of a further embodiment of the present invention.

In accordance with a further embodiment of the detachable component wire frame glasses 80 of the present invention, there is provided a means for removably retaining the lenses 82 and 84 within the wire frame 86. Referring to FIG. 6, there is disclosed a lens 84 mounted in a frame 86 which has been provided with a frame closure lock 98. Closure lock 98 may be provided at any location along the perimeter of lens 84, such as on the lateral end as illustrated, on a medial surface, or at the connection point between the frame 86 and the flange 91.

The closure lock 98 in the embodiment illustrated in FIG. 6 comprises a threaded barrel 100 secured to the frame 86. Threaded barrel 100 is axially aligned with a tubular sleeve 102 secured to an adjacent portion of frame 86. A discontinuity or space 103 is provided in the frame 86 between the threaded barrel 100 and sleeve 102, as will be understood by one of skill in the art.

A screw 104 extends axially through the sleeve 102 and into the threaded barrel 100. Tightening or loosening screw 104 will draw adjacent ends 106 and 108 of frame 86 towards each other or away from each other, thereby reducing or enlarging the circumference of the frame 86 which encircles lens 84.

In this manner, the circumference of frame 86 can be enlarged to release the lens 84 so that it may be interchanged with another lens having different refractive properties or different color densities or other design configurations.

A variety of alternative embodiments based upon the axially aligned barrel embodiment are contemplated herein. For example, the sleeve 102 or a flange need only have a sufficient axial length to support the screw 104. The screw 104 may be a conventional threaded machine screw, or may be a modified rod having one or more radially outwardly extending projections or a medical luer lock configuration.

A rod having a "T" shaped distal end can be inserted into a keyway in the opposing barrel, and rotation of the rod through an angle, e.g., of about 90° will move the "T" structure out of alignment with the keyway to prevent retraction of the rod. In general, any locking structure which involves a rod or pin which is rotatable from a first, aligned position to permit axial insertion into a keyway, and a second, nonaligned position to prevent retraction from the keyway will work.

In any of the foregoing "barrel" embodiments of the closure lock, the closure lock structure can be located at any convenient point around the periphery of the lens. Preferably, the closure lock will be disposed on the posterior side of the flange 91.

Figure 7:
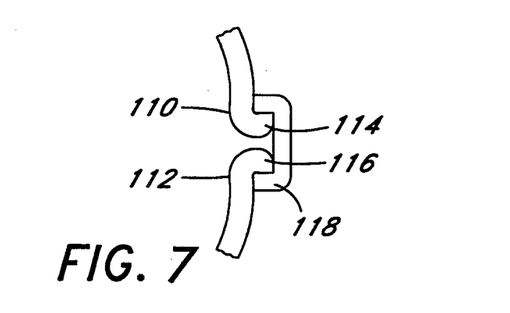
FIG. 7 is a partial elevational view of a frame closure lock in accordance with the present invention.

Referring to FIG. 7, there is disclosed another embodiment of the frame closure lock in accordance with the present invention. In this embodiment, the frame is severed to provide two abutting ends 110 and 112 having a space therebetween. Each of ends 110 and 112 is provided with an outwardly extending projection 114 and 116, respectively. Once a lens 84 has been disposed within the wire frame 86, the ends 110 and 112 are manually drawn towards each other, and a retention clip 118 may be snapped over the projections 114 and 116 to retain the frame 86 in its reduced circumference configuration, thereby retaining the lens.

For this purpose, the contact surfaces between the abutment 114, 116 and the clip 118 are preferably configured in a manner that provides an interference fit to retain the clip 118 in place until the resilience of the clip 118 is overcome, such as by prying with a fingernail or removal tool. The contact surfaces between the clip 118 and abutments 114 and 116 will therefore be angled and toleranced in a manner that provides a sufficient resistance to removal of clip 118 that it will not be likely to come unconnected during normal use. Clip 118 may be constructed from metal, or from any of a wide variety of polymeric materials which are known in the sunglass manufacturing art.

In a variation of the foregoing, the nose piece, nosepiece connector 96 or flange 91 may be configured to function as clip 118, thereby permitting interchangeability of the lens by removing an eyeglass component. For example, one end 106 of frame 86 can be bonded to flange 91, and the space 103 provided in the frame at a point adjacent the connection to flange 91. The other end 108 can then be removably secured to the flange to accomplish the interchangeability of lenses.

The lens 84 and frame 86 may be provided with any of a variety of interlock structures which will become apparent to one of skill in the art in view of the disclosure herein. For example, the outer periphery of lens 84 in one embodiment is provided with a radially inwardly extending channel extending all the way around for receiving a wire frame 86 therein. Tightening of the frame closure lock 98 reduces the circumference of the wire 86 so that it rests in the channel formed around the circumference of the lens 84. In an alternate embodiment, the lens 84 is provided with a radially outwardly extending flange having the same or a reduced thickness compared to the remainder of the lens. The flange is received within a groove provided around the inside surface of the wire frame 86 to provide an interlock fit.

Thus, there has been provided in accordance with this aspect of the present invention a detachable component system having interchangeable left and right lenses, an interchangeable nose piece and interchangeable connectors for providing hinged support to a pair of removably secured earstems. Although described as a wire frame eyeglass 80, it is to be understood that the wire 86 can readily be replaced by stamped or rolled metal sheet stock or extruded or molded polymeric materials, which extend outwardly from the contact surface with the lens as far as is practical for a given purpose. For example, in an embodiment intended for use as protective eyewear, the frame 86 preferably extends a relatively large distance from side to side and from top to bottom to create a "mask" of metal or plastic which will provide sufficient eye protection for the intended application. In this manner, protective prescription lens eyewear may be provided for a wide variety of uses, ranging from surgery, welding, bicycle racing and others.

Although this invention has been described in terms of certain preferred embodiments, other embodiments that are apparent to those of ordinary skill in the art are also within the scope of this invention. Accordingly, the scope of this invention is intended to be limited only by the appended claims.

What is claimed is:

1. A connector for eyeglasses, for connecting one or more earstems to a lens, said connector comprising:
    a main body with a lateral end and a medial end;
    a lens receiving channel extending from the medial end in the direction of the lateral end;
    a first interlock structure in the lateral end of the channel, said first interlock structure comprising a locking surface for engaging a corresponding locking surface on the lens for resisting vertical upward motion of the lateral end of the connector with respect to the lens, said locking surface on the first interlock structure comprising a ramped edge of a projection on the connector; and
    a second interlock structure spaced apart from the lateral end of the channel.

2. A connector for eyeglasses as in claim 1, wherein the projection is integrally molded on the connector and extends within the channel in the medial direction.

3. A connector for eyeglasses as in claim 1, wherein the second interlock structure comprises a locking surface for releasably engaging a corresponding locking surface on the lens.

4. A connector for eyeglasses as in claim 1, wherein the second interlock structure comprises a projection within the channel for engaging a recess in the lens.

5. A connector for eyeglasses as in claim 4, wherein the second interlock structure comprises first and second projections on the connector extending toward each other from opposite sides of the channel.

6. An eyeglass, comprising a lens, an earstem, and at least one connector as defined in claim 1 for removably connecting the earstem to the lens.

7. A eyeglass as in claim 6, further comprising an earstem pivotally secured to the connector.

8. An eyeglass, comprising a lens, an earstem, and at least one connector as defined in claim 1 for removably connecting the earstem to the lens.

9. Sunglasses, comprising:
    a unitary transparent lens adapted to extend in the path of the wearer's left and right eye fields of vision; and
    at least one connector as defined in claim 1 extending along a portion of an edge of said lens, said lens having at least one projection on the lens to interlock with said connector.

10. A sunglass as in claim 9, further comprising a second connector secured to said lens.

11. A sunglass as in claim 9, further comprising an earstem pivotally secured to said connector.

12. A sunglass as in claim 9, wherein said connector extends no more than about one-third of the way across a top edge of the lens.

13. A sunglass as in claim 9, wherein the connector extends no more than about one-fifth of the way across the top edge of the lens.

14. A sunglass as in claim 9, wherein said connector extends along at least a portion of the lateral edge of the lens.

15. A sunglass as in claim 9, wherein said connector extends along at least a portion of the bottom edge of the lens.

16. The connector of claim 1, further comprising an earstem pivotally secured to the connector.

17. A connector for eyeglasses, for connecting one or more earstems to a lens, said connector comprising:
    a main body with a lateral end and a medial end;
    a lens receiving channel extending from the medial end in the direction of the lateral end;
    a first interlock structure in the lateral end of the channel; and
    a second interlock structure spaced apart from the lateral end of the channel, said second interlock structure comprising a recess in the channel for receiving a projection on the lens.

18. An eyeglass, comprising:
    a lens, said lens having a connector contacting surface having a projection at a lateral point thereon and a recess at a medial point thereon;
    an earstem; and
    at least one connector for connecting one or more earstems to a lens, said connector comprising a main body with a lateral end and a medial end; a lens receiving channel extending from the medial end in the direction of the lateral end; a first interlock structure in the lateral end of the channel; and a second interlock structure spaced apart from the lateral end of the channel, said connector for removably connecting the earstem to the lens.

* * * * *

(12) EX PARTE REEXAMINATION CERTIFICATE (9539th)
United States Patent
Tackles (10) Number: US 5,387,949 C1
(45) Certificate Issued: Mar. 5, 2013

(54) EYEGLASS CONNECTION DEVICE

(75) Inventor: George Tackles, Lake Elsinore, CA (US)

(73) Assignee: Oakley, Inc., Irvine, CA (US)

Reexamination Request:
No. 90/011,994, Nov. 1, 2011

Reexamination Certificate for:
Patent No.: 5,387,949
Issued: Feb. 7, 1995
Appl. No.: 07/825,476
Filed: Jan. 29, 1992

(51) Int. Cl.
*G02C 5/14* (2006.01)
*G02C 5/00* (2006.01)

(52) U.S. Cl. ............ 351/121; 351/44; 351/110; 351/140

(58) Field of Classification Search ....................... None
See application file for complete search history.

(56) References Cited

To view the complete listing of prior art documents cited during the proceeding for Reexamination Control Number 90/011,994, please refer to the USPTO's public Patent Application Information Retrieval (PAIR) system under the Display References tab.

*Primary Examiner* — Kenneth J Whittington (57) ABSTRACT

Disclosed is a connector for use in connecting a lens to an earstem, comprising a main body which contains a hinge end and a lens receiving end. The connector contains a channel for receiving a portion of the lens. The pivot end of the channel contains a recess whereas the locking end of the channel contains a projection. The hinge end of the connector is attached to the earstem by a releasable pin connection. The lens is connected to the connector by inserting a lens into the channel where the lens is pivoted at the pivot end and then the connector is snapped down to cover over the top edge of the lens. Variations, component parts, and a wire frame dual lens detachable component system are also disclosed.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4, 6-8 and 16-18 are cancelled.

Claims 5 and 9-15 were not reexamined.

\* \* \* \* \*